United States Patent
Epstein et al.

(10) Patent No.: US 12,541,537 B2
(45) Date of Patent: Feb. 3, 2026

(54) DEVICE DISCOVERY SYSTEM

(71) Applicant: CISCO TECHNOLOGY, INC., San Jose, CA (US)

(72) Inventors: Steve Epstein, Hashmonaim (IL); Ezra Darshan, Beit Shemesh (IL); Harel Cain, Jerusalem (IL); Shali Mor, Modiin (IL)

(73) Assignee: Cisco Technology, Inc., San Jose, CA (US)

( * ) Notice: Subject to any disclaimer, the term of this patent is extended or adjusted under 35 U.S.C. 154(b) by 164 days.

(21) Appl. No.: 17/343,379

(22) Filed: Jun. 9, 2021

(65) Prior Publication Data

US 2021/0294820 A1    Sep. 23, 2021

Related U.S. Application Data

(63) Continuation of application No. 15/068,754, filed on Mar. 14, 2016, now abandoned.

(51) Int. Cl.
*G06F 16/00* (2019.01)
*G06F 16/23* (2019.01)
(Continued)

(52) U.S. Cl.
CPC ............ *G06F 16/285* (2019.01); *G06F 16/23* (2019.01); *H04L 41/12* (2013.01);
(Continued)

(58) Field of Classification Search
CPC .............................. G06F 16/23; G06F 16/285
(Continued)

(56) References Cited

U.S. PATENT DOCUMENTS 6,345,319 B2 * 2/2002 Lin ...................... G06F 9/4413
                                                          719/321
6,377,987 B1 * 4/2002 Kracht .................... H04L 41/22
                                                          370/254
(Continued)

FOREIGN PATENT DOCUMENTS

WO    WO-2015036793    3/2015

OTHER PUBLICATIONS

Microsoft—Device Classes—Windows 10 hardware dev; Jan. 2016; available on the web at: http://msdn.microsoft.com/en-us/library/windows/hardware/ff541190(v=vs.85).aspx.
(Continued)

*Primary Examiner* — Ann J Lo
*Assistant Examiner* — Rezwanul Mahmood
(74) *Attorney, Agent, or Firm* — Lee & Hayes, P.C.

(57) ABSTRACT

In one embodiment, a device discovery system includes a data storage medium to store a clustered data structure including device signatures grouped according to clusters. Each device signature includes device information. Each cluster from a sub-set of the clusters has a different device name. The system also includes an input/output sub-system to receive, from a remote device, a first device signature describing information about a first device, and a processor to perform a decision process based on the clustered data structure with the first device signature as input yielding an output including a first device name or an indication that a name associated with the first device signature is unknown. The processor is operative to prepare a response message including data about the output. The input/output sub-system is operative to send the response message to the remote device.

18 Claims, 9 Drawing Sheets

(51) Int. Cl.
  *G06F 16/28* (2019.01)
  *H04L 9/40* (2022.01)
  *H04L 41/12* (2022.01)
  *H04L 67/1095* (2022.01)
  *H04L 67/12* (2022.01)

(52) U.S. Cl.
  CPC ...... *H04L 63/0876* (2013.01); *H04L 63/1483* (2013.01); *H04L 67/1095* (2013.01); *H04L 67/12* (2013.01)

(58) Field of Classification Search
  USPC .......................................................... 707/737
  See application file for complete search history.

(56) References Cited

U.S. PATENT DOCUMENTS

| | | | |
|---|---|---|---|
| 6,449,612 B1 | 9/2002 | Bradley et al. | |
| 7,340,769 B2* | 3/2008 | Baugher | H04N 21/00 713/168 |
| 7,886,033 B2* | 2/2011 | Hopmann | H04L 12/2807 709/224 |
| 8,266,427 B2 | 9/2012 | Thubert et al. | |
| 8,396,822 B2 | 3/2013 | Dasgupta et al. | |
| 8,429,153 B2* | 4/2013 | Birdwell | G06F 18/2323 707/723 |
| 8,463,788 B2* | 6/2013 | Bandyopadhyay | H04L 67/1008 707/827 |
| 8,635,316 B2 | 1/2014 | Barnhill, Jr. | |
| 8,725,842 B1* | 5/2014 | Al-Nasser | G06F 3/041 709/219 |
| 9,057,746 B1 | 6/2015 | Houlette et al. | |
| 9,106,693 B2 | 8/2015 | Quinlan et al. | |
| 9,152,737 B1* | 10/2015 | Micali | G01R 21/133 |
| 9,253,021 B2* | 2/2016 | Vasseur | H04L 41/044 |
| 9,292,793 B1* | 3/2016 | Lin | G06F 21/44 |
| 9,367,687 B1 | 6/2016 | Warshenbrot | G06F 21/565 |
| 9,386,356 B2* | 7/2016 | Harrison | H04L 63/10 |
| 9,411,009 B1* | 8/2016 | Aguayo Gonzalez | G01R 21/00 |
| 9,419,964 B2* | 8/2016 | Srivastav | G06F 21/33 |
| 9,451,414 B1* | 9/2016 | Birkenes | H04W 4/029 |
| 9,460,390 B1* | 10/2016 | Lin | G06N 7/01 |
| 9,519,772 B2* | 12/2016 | Harrison | H04L 67/306 |
| 9,554,061 B1* | 1/2017 | Proctor, Jr. | H04S 7/00 |
| 9,569,520 B1* | 2/2017 | Langton | G06F 16/285 |
| 9,686,596 B2* | 6/2017 | Harrison | H04L 67/02 |
| 9,813,324 B2* | 11/2017 | Nampelly | H04L 69/22 |
| 9,838,352 B2* | 12/2017 | Wetterwald | H04L 61/103 |
| 9,922,094 B1* | 3/2018 | Perumal | G06F 16/9536 |
| 10,084,811 B1* | 9/2018 | Dinning | H04L 63/1433 |
| 10,218,726 B2* | 2/2019 | Vasseur | H04L 63/0236 |
| 10,769,006 B2* | 9/2020 | Kao | G06F 11/0751 |
| 10,893,058 B1* | 1/2021 | Casaburi | G06F 21/566 |
| 10,999,146 B1* | 5/2021 | Savalle | G06N 3/08 |
| 11,151,476 B2* | 10/2021 | Mermoud | G06N 7/01 |
| 11,200,488 B2* | 12/2021 | Wong | G06N 7/01 |
| 11,283,830 B2* | 3/2022 | Vasseur | H04L 63/0263 |
| 11,399,023 B2* | 7/2022 | Vasseur | H04L 63/0876 |
| 11,448,727 B2* | 9/2022 | Ozturk | G01S 7/354 |
| 11,528,231 B2* | 12/2022 | Vasseur | H04L 41/145 |
| 2006/0277224 A1* | 12/2006 | Aftab | G06F 16/275 |
| 2007/0019535 A1* | 1/2007 | Sambhwani | H04J 13/18 370/342 |
| 2007/0055698 A1* | 3/2007 | McCoy | G06Q 50/08 |
| 2007/0133485 A1* | 6/2007 | Tredoux | H04L 67/52 370/338 |
| 2007/0244690 A1* | 10/2007 | Peters | G06F 40/279 707/E17.09 |
| 2008/0065649 A1* | 3/2008 | Smiler | G06F 16/972 |
| 2008/0228908 A1* | 9/2008 | Link | H04L 41/5058 709/223 |
| 2008/0281787 A1* | 11/2008 | Arponen | G06F 16/24 |
| 2009/0119256 A1* | 5/2009 | Waters | G06F 16/9535 |
| 2009/0119280 A1* | 5/2009 | Waters | G06F 16/951 707/999.005 |
| 2010/0162383 A1* | 6/2010 | Linden | G06F 11/2028 726/13 |
| 2010/0280978 A1* | 11/2010 | Shimada | H02J 13/00028 706/54 |
| 2010/0284300 A1* | 11/2010 | Deshpande | H04L 43/026 370/253 |
| 2011/0099205 A1* | 4/2011 | Shmueli | G06F 16/83 707/E17.044 |
| 2011/0197071 A1* | 8/2011 | Wolcott | H04L 25/03 713/176 |
| 2012/0079101 A1* | 3/2012 | Muppala | H04L 63/1425 709/224 |
| 2012/0143836 A1* | 6/2012 | Fried | G06F 11/1004 707/697 |
| 2012/0143892 A1* | 6/2012 | Fried | G06F 9/4411 707/769 |
| 2012/0197929 A1* | 8/2012 | Williams | H04L 43/0817 707/769 |
| 2013/0002540 A1* | 1/2013 | Ajitomi | G06F 16/9538 345/156 |
| 2013/0046871 A1* | 2/2013 | Vik | H04W 4/023 709/223 |
| 2013/0054603 A1* | 2/2013 | Birdwell | G06F 16/2465 707/738 |
| 2013/0173621 A1* | 7/2013 | Kapoor | G06F 16/353 707/E17.089 |
| 2013/0179124 A1* | 7/2013 | Patel | G01R 22/10 702/190 |
| 2013/0237242 A1* | 9/2013 | Oka | H04W 4/029 455/456.1 |
| 2013/0262686 A1* | 10/2013 | Hill | H04L 65/4038 709/228 |
| 2014/0108206 A1* | 4/2014 | Chechuy | G06Q 30/0603 705/27.1 |
| 2014/0115339 A1* | 4/2014 | Lu | H04L 63/0823 713/176 |
| 2014/0129560 A1* | 5/2014 | Grokop | G06F 16/285 707/737 |
| 2014/0149554 A1* | 5/2014 | Krishna | G06F 16/43 709/219 |
| 2014/0164178 A1* | 6/2014 | Adjaoute | G06Q 30/0609 705/26.35 |
| 2014/0181107 A1* | 6/2014 | Coburn, IV | H04N 21/439 707/737 |
| 2014/0244828 A1* | 8/2014 | Besehanic | H04L 67/535 709/224 |
| 2014/0244856 A1 | 8/2014 | Kambhatla | |
| 2014/0280846 A1 | 9/2014 | Gourlay | |
| 2014/0337340 A1* | 11/2014 | Yang | G06Q 50/01 707/737 |
| 2014/0358924 A1* | 12/2014 | Seo | G06F 16/285 707/737 |
| 2014/0359771 A1* | 12/2014 | Dash | G06F 11/3476 726/23 |
| 2015/0019557 A1* | 1/2015 | Hsieh | G06F 16/211 707/754 |
| 2015/0039513 A1* | 2/2015 | Adjaoute | G06Q 30/0609 705/44 |
| 2015/0074741 A1* | 3/2015 | Janakiraman | H04L 63/101 709/225 |
| 2015/0095334 A1* | 4/2015 | Tsuji | G06F 16/26 707/737 |
| 2015/0100426 A1* | 4/2015 | Hartzell | G06Q 30/0205 705/14.58 |
| 2015/0134653 A1* | 5/2015 | Bayer | H04N 21/4826 707/732 |
| 2015/0150079 A1* | 5/2015 | Hyatt | H04L 43/045 726/1 |
| 2015/0178095 A1* | 6/2015 | Balakrishnan | G06F 13/364 710/110 |
| 2015/0185262 A1* | 7/2015 | Song | G06N 20/10 702/64 |
| 2015/0227611 A1* | 8/2015 | Bao | H04L 67/10 707/737 |

(56) References Cited

U.S. PATENT DOCUMENTS

| | | | |
|---|---|---|---|
| 2015/0280977 A1 | 10/2015 | Curiel | |
| 2015/0309490 A1 | 10/2015 | Patel et al. | |
| 2015/0324356 A1* | 11/2015 | Andres Gutierrez | H04N 21/4668 707/734 |
| 2015/0324465 A1* | 11/2015 | Logan | G06F 16/2246 707/770 |
| 2015/0339274 A1* | 11/2015 | Pappu | H04N 21/435 715/205 |
| 2015/0347043 A1* | 12/2015 | Barron | G06F 3/0689 711/114 |
| 2015/0370848 A1* | 12/2015 | Yach | G06F 16/2365 707/694 |
| 2016/0006755 A1* | 1/2016 | Donnelly | H04L 63/18 726/1 |
| 2016/0050536 A1* | 2/2016 | You | G06F 16/29 455/456.3 |
| 2016/0182657 A1* | 6/2016 | Mukherjee | H04L 67/535 709/223 |
| 2016/0205106 A1* | 7/2016 | Yacoub | H04W 12/041 726/28 |
| 2016/0241933 A1* | 8/2016 | Harrison | G06F 16/783 |
| 2016/0251933 A1 | 9/2016 | Gharesi et al. | |
| 2016/0277431 A1* | 9/2016 | Yu | H04L 63/1425 |
| 2016/0301434 A1 | 10/2016 | Botchway | |
| 2016/0342791 A1* | 11/2016 | Aguayo Gonzalez | G06F 21/32 |
| 2016/0344693 A1* | 11/2016 | Wetterwald | H04L 61/103 |
| 2016/0366040 A1* | 12/2016 | Nampelly | H04L 67/02 |
| 2017/0076323 A1* | 3/2017 | Palanciuc | G06Q 30/0255 |
| 2017/0098245 A1* | 4/2017 | Palanciuc | G06Q 30/0266 |
| 2017/0134232 A1* | 5/2017 | Palanciuc | H04L 41/0816 |
| 2017/0206559 A1* | 7/2017 | Bakshi | H04W 4/021 |
| 2017/0214702 A1* | 7/2017 | Moscovici | H04W 12/106 |
| 2017/0250879 A1* | 8/2017 | Chadha | H04L 61/35 |
| 2017/0262523 A1* | 9/2017 | Epstein | G06F 16/285 |
| 2017/0279829 A1* | 9/2017 | Vasseur | H04L 63/1458 |
| 2017/0329955 A1* | 11/2017 | Hessler | H04L 63/12 |
| 2018/0077676 A1* | 3/2018 | Kaloxylos | H04W 68/02 |
| 2018/0225592 A1* | 8/2018 | Ponnuswamy | G06N 20/00 |
| 2020/0344203 A1* | 10/2020 | Mermoud | H04L 61/5014 |
| 2020/0358794 A1* | 11/2020 | Vasseur | G06F 16/285 |
| 2020/0382553 A1* | 12/2020 | Savalle | G06N 20/00 |
| 2021/0294820 A1* | 9/2021 | Epstein | H04L 67/12 |
| 2021/0303598 A1* | 9/2021 | Mermoud | G06F 16/2358 |
| 2021/0328986 A1* | 10/2021 | Vasseur | H04L 63/20 |
| 2021/0377215 A1* | 12/2021 | Wang | H04L 63/20 |
| 2021/0406255 A1* | 12/2021 | Raghuramu | G06F 16/245 |
| 2023/0214384 A1* | 7/2023 | Kerkes | H04L 61/4552 707/769 |
| 2024/0291721 A1* | 8/2024 | Costante | G06F 16/285 |

OTHER PUBLICATIONS

Microsoft—Creating a New Device Setup Class—Windows 10 hardware dev; Jan. 2016; available on the web at: https://msdn.microsoft.com/en-us/library/windows/hardware/ff540189(v=vs.85).aspx.

"Edit distance," Wikipedia; Dec. 8, 2015; available on the web at: https://en.wikipedia.org/w/index.php?title=Edit_distance&oldid=692669640.

"Levenshtein distance," Wikipedia; Dec. 8, 2015; available on the web at: https://en.wikipedia.org/w/index.php?title=Levenshtein_distance&oldid=688663203.

"Jaccard index," Wikipedia; Dec. 8, 2015; available on the web at: https://en.wikipedia.org/w/index.php?title=Jaccard_index&oldid=688763411.

"Euclidean distance," Wikipedia; Dec. 8, 2015; available on the web at: https://en.wikipedia.org/w/index.php?title=Euclidean_distance&oldid=680026113.

Cheng, Huang et al.; "Clustering algorithms research for device-clustering localization," in Indoor Positioning and Indoor Navigation (IPIN), 2012 International Conference on, vol., No., pp. 1-7, Nov. 13-15, 2012.

Cheng, Huang et al.; "Device-clustering algorithm in crowdsourcing-based localization"; in: The Journal of China Universities of Posts and Telecommunications; Oct. 2012; 19:114-121. DOI: 10.1016/S1005-8885(11)60434-2.

Grimaudo, Luigi et al.; "SeLeCT: Self-Learning Classifier for Internet Traffic" in: IEEE Transactions on Network and Service Management, vol. 11, No. 2, Jun. 2014.

"Developing Solutions for the Internet of Things"; Intel; May 1, 2014.

Kliem, A. et al.; "The Device Driver Engine—Cloud enabled ubiquitous device integration," in Intelligent Sensors, Sensor Networks and Information Processing (ISSNIP), 2015 IEEE Tenth International Conference on, vol., No., pp. 1-7, Apr. 7-9, 2015.

Song, Yang et al.; "Efficient topic-based unsupervised name disambiguation"; in Proceedings of the [th] ACM/IEEE-CS joint conference on Digital libraries (JCDL '07). ACM, New York, NY, USA, 342-351; Jun. 18, 2007; available on the web at:http://dx.doi.org/10.1145/1255175.1255243.

Wang, Yu et al.; "Automatic Application Signature Construction from Unknown Traffic" in: 24th IEEE International Conference on Advanced Information Networking and Applications; Apr. 20, 2010.

Zhang, Jun et al.; "An Effective Network Traffic Classification Method with Unknown Flow Detection" in: IEEE Transactions on Network and Service Management, vol. 10, No. 2, Jun. 2013.

* cited by examiner

DEVICE DISCOVERY SYSTEM

CROSS-REFERENCE TO RELATED APPLICATION

This application is a Continuation Application of U.S. patent application Ser. No. 15/068,754, filed Mar. 14, 2016, entitled DEVICE DISCOVERY SYSTEM, by Steve Epstein, et al., the contents of which are incorporated herein by reference.

TECHNICAL FIELD

The present disclosure generally relates to device discovery based on clustering.

BACKGROUND

The Internet of Things (IoT), using technology such as Internet Protocol version 6, by way of example only, enables a practically unlimited number of devices, such as sensors and actuators, to connect to either private networks or the Internet at large and be monitored or controlled from remote servers. One of the main industries capitalizing on this functionality is the home automation industry where millions of devices can be purchased in local retail stores all over the world and be connected to home gateways as part of an elaborate interconnected system. The devices range from connected televisions to motion detectors, from connected doors and/or windows to individual lights. In such a system, all devices, of any size and manufactured in any country, may be controlled by one or more home automation applications that may run on most mobile devices. Each device/thing may also be monitored and/or configured by the manufacturers' servers. However, just as each and every home automation device provides some useful function, each device/thing may pose a threat to the system, because any malware, rootkit or advanced persistent threat can hide in any of the connected devices and either sabotage or perform espionage on any aspect of the digital home or use the device as a platform from which to mount attacks on other nodes on the Internet. For security and other reasons it is very useful to know the type, make and model of each connected device in the home in order to make appropriate decisions based on the device type, make and model.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present disclosure a device discovery system including a data storage medium to store a clustered data structure including a plurality of device signatures grouped according to a plurality of clusters clustered in accordance with a clustering algorithm based on the plurality of device signatures as input to the clustering algorithm. The clustered data structure also including a plurality of device names. Each of the plurality of device signatures includes device information. A sub-set of the plurality of clusters is associated with the plurality of device names such that each first cluster of the plurality of clusters in the sub-set has a different one of the plurality of device names. Each of the plurality of device names includes a device attribute. The system also includes an input/output sub-system to receive, from a remote device, a first device signature describing information about a first device. The system also includes a device identification processor to perform a decision process based on the clustered data structure with the first device signature as input yielding an output including a first device name among the plurality of device names or an indication that a name associated with the first device signature is unknown. The device identification processor is operative to prepare a response message including data about the output. The input/output sub-system is operative to send the response message to the remote device.

DETAILED DESCRIPTION

Figure 1:
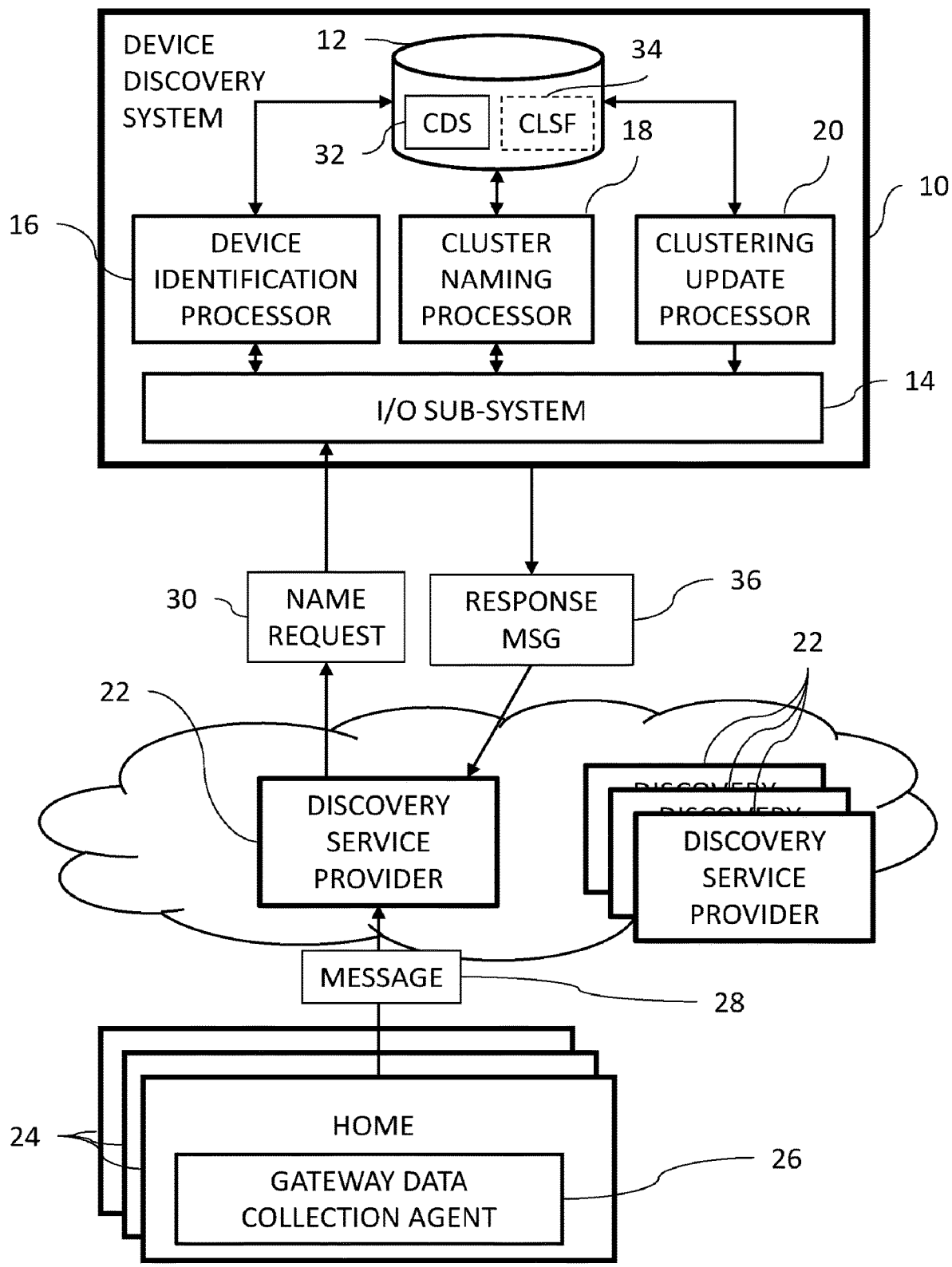
FIG. 1 is a block diagram view of a device discovery system constructed and operative in accordance with an embodiment of the present disclosure.

Reference is now made to FIG. 1, which is a block diagram view of a device discovery system 10 constructed and operative in accordance with an embodiment of the present disclosure. By way of introduction, enabling unified mobile applications, providing service providers with detailed and accurate marketing data and responding to the potential security threats typically benefit from the identification of the model of each and every device in the home. Examples of actions that can be applied to devices once identified are: quarantining a potentially malicious device by applying separate virtual local area networks (VLANs); applying targeted intrusion prevention system (IPS) and/or intrusion detection system (IDS) rules and signatures to protect against malicious devices found in each home; whitelisting servers that each home Internet of Things (IoT) device may communicate with; pushing queries or other relevant data to each home IoT device; displaying informative information to both the home owner and the security operations center (SOC) of a service provider; deriving association rules (e.g., what people buy together with what) and other business/marketing data about what people own, where, when and by whom; and applying latest patches for each home IoT device.

The device discovery system 10 is operative to try to identify all devices in the home from a domain of many thousands or tens of thousands of possible device models, produced and manufactured across the globe, numbers which are increasing each day. Current methods of device identification typically work with supervised data that has been tested and classified based on a trusted training set of known data in a controlled environment and does not provide a solution to analyzing the plethora of unsupervised data that cannot be easily labelled. However, the device discovery system 10 is based on an unsupervised data model and includes automating the process of disambiguating or labeling of unknown devices as will be described in more detail below. It should also be noted that there is typically no standard communication protocol for home automation devices; hence, no standard communication methods, protocols or information may be assumed per home automation device or device type. The device discovery system 10 provides device discovery services based on a best effort clustering of a set of heterogeneous devices with different discovery protocol information as will be described in more detail below.

The device discovery system 10 provides device discovery services to a plurality of discovery service providers 22. Each of the discovery service providers 22 provides services to a plurality of homes 24, e.g., applying security and other policies to the devices in the homes 24. Each home 24 may include a gateway data collection agent 26. The gateway data collection agent 26 of each home 24, supported by the discovery service providers 22, collects and probes device identification information and device properties from network protocols, agents, services and techniques used by some devices/things in the home such as: Dynamic Host Configuration Protocol (DHCP); Hypertext Transfer Protocol (HTTP) User Agents; Network Mapper (NMAP) Port Scans; Universal Plug and Play (UpNp) discovery; BonJour; Banner Grabbing; Address Resolution Protocol (ARP); and media access control (MAC) Address Prefix, by way of example only. This information may be collected in either a single pass or multiple passes depending on performance requirements for each new device which is connected to the home 24. Alternatively or additionally, this information may be collected passively by eavesdropping to broadcast messages or actively by querying the devices, depending on the protocol. It should be noted that not every device necessarily responds to all discovery protocols, and even two device instances of the same model might not respond with the same protocols, as the response may also depend on the specific network setup in which the devices reside. The gateway data collection agent 26 creates a message 28 which includes a home identification (ID) and discovery data based on the above information of the new device. The message 28 is received by the discovery service provider 22 associated with the home 24. The discovery service provider 22 may further process the discovery data to form a new device signature for the new device according to data formatting requirements of the device discovery system 10. It should be noted that the new device is described as a "new" device for the sake of convenience only. However, it will be appreciated that the device discovery system 10 may also be implemented using a device signature of a device which has been installed in the discovery home 24 for any period of time. The discovery service provider 22 creates a name request 30 including a request identification (ID) and the new device signature. The name request 30 is then sent to the device discovery system 10 for processing. It will be appreciated throughout that the functionality of the device discovery system 10 may be incorporated into each of the discovery service providers 22.

The device discovery system 10 includes a data storage medium 12, an input/output sub-system 14, a device identification processor 16, a cluster naming processor 18 and a clustering update processor 20. The data storage medium 12 is operative to store a clustered data structure 32 and optionally a classifier 34 based on the data of the clustered data structure 32. The clustered data structure 32 is described in more detail with reference to FIG. 2. The device identification processor 16 is operative to receive the name request 30 including the new device signature, check if the new device signature includes enough information (described in more detail with reference to FIG. 3), and perform a decision process based on the clustered data structure 32 with the new device signature as input yielding an output. The output may include a device name or an indication that a name associated with the new device signature is unknown. The device identification processor 16 is operative to prepare a response message 36 for sending to the discovery service provider 22 via the input/output sub-system 14. The above process and the device identification processor 16 is described in more detail with reference to FIGS. 2 and 3. The cluster naming processor 18 is operative to collect device names for the clustered data structure 32. The cluster naming processor 18 is described in more detail with reference to FIGS. 4-6. The clustering update processor 20 is operative to re-cluster the clustered data structure 32 and perform other updating functions. The clustering update processor 20 is described in more detail with reference to FIGS. 7 and 8.

Figure 2:
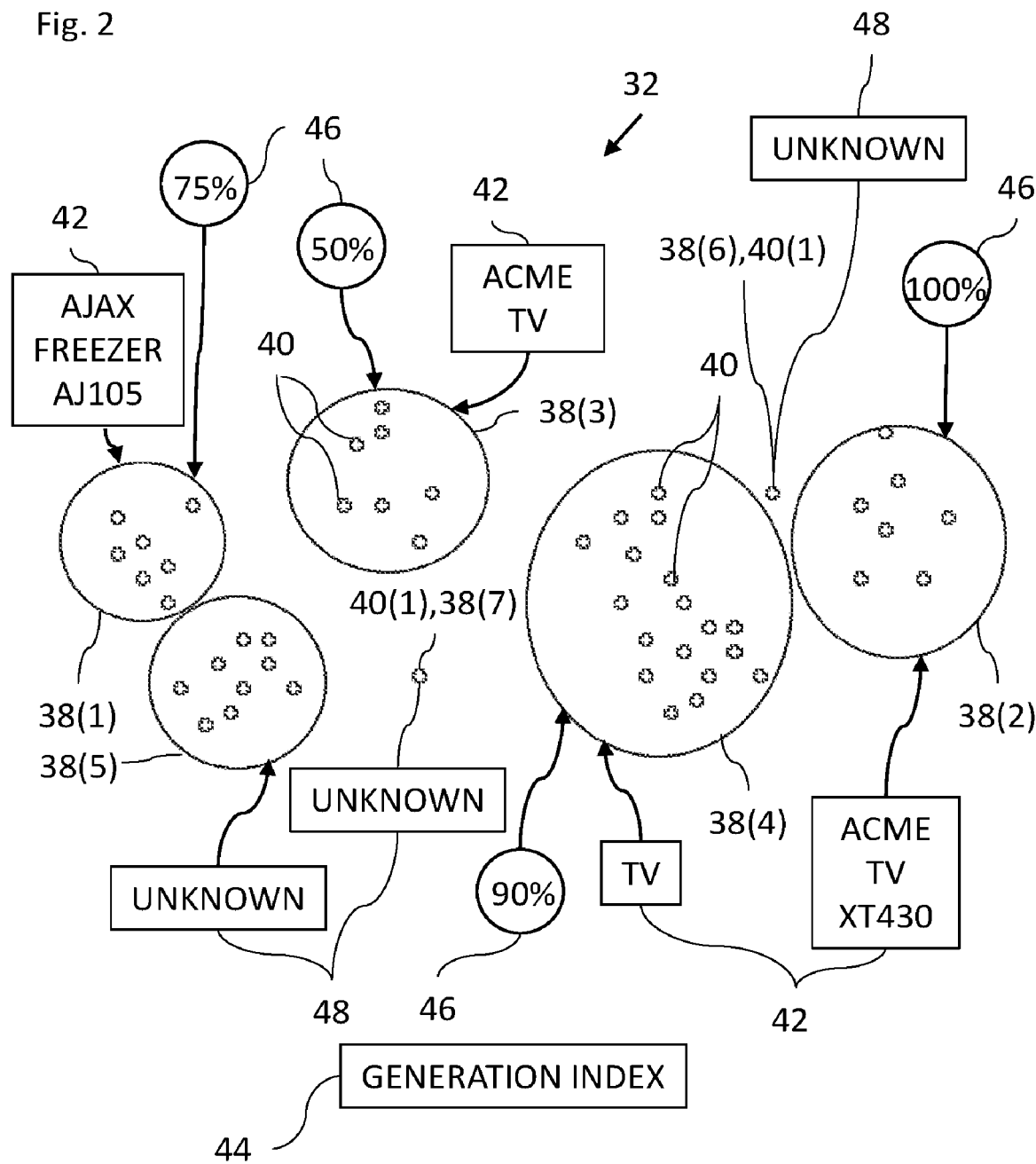
FIG. 2 is a partly pictorial, partly block diagram view of a clustered data structure in the device discovery system of FIG. 1.

Reference is now made to FIG. 2, which is a partly pictorial, partly block diagram view of the clustered data structure 32 in the device discovery system 10 of FIG. 1. The clustered data structure 32 includes a plurality of device signatures 40 grouped according to a plurality of clusters 38 clustered in accordance with a clustering algorithm based on the device signatures 40 as input to the clustering algorithm. The clustering algorithm may be any suitable clustering algorithm, for example, but not limited to, K-Means, Affinity Propagation and Agglomerative Clustering. For the sake of simplicity only some of the device signatures 40 are labeled with a reference numeral. Some of the device signatures 40 are clearly clustered with other device signatures 40 whereas some of the device signatures 40, labeled device signatures 40(1), are clearly not clustered with other device signatures 40. Each device signature 40 typically includes device information about the device that the device signature 40 is describing. The device signatures 40 are clustered in such a way that the device signatures 40 belonging to one of the clusters 38 generally originate from devices having the same device attribute, for example, the same device model, the same device operating system or the same device hardware element depending upon the various parameters used in the clustering algorithm, such as weights, described in more detail with reference to FIG. 3.

In one embodiment, each new device signature 40 received by the device discovery system 10 (FIG. 1), assuming it passes a minimum data requirement described in more detail with reference to FIG. 3, is compared to data in the clustered data structure 32 to find a closest matching cluster 40. If a closest matching cluster to the new device signature 40 is not found, a new cluster may be created and added to the clustered data structure 32. The new device signature 40 is then added to the clustered data structure 32. In this way the clustered data structure 32 grows. The clustered data structure 32 is optionally re-clustered periodically. Each newly re-clustered version of the clustered data structure 32 has a generation index 44 which is incremented for each new re-clustering. It should be noted that the latest version of the clustered data structure 32 is then used as the basis for the decision process mentioned above with reference to FIG. 1 and the previous versions of the clustered data structure 32 are generally discarded. Re-clustering of the clustered data structure 32 is described in more detail with reference to FIGS. 7 and 8. The clustered data structure 32 may initially be seeded with device signatures 40 collected from various devices and an initial clustering may be performed before the device discovery system 10 goes live. Alternatively, the device discovery system 10 may go live with no device signature data in the clustered data structure 32 and clustering performed as soon as enough data points are acquired. The minimum number of data points to start clustering is theoretically only two data points so the number of required data points may be set at any suitable number.

The clustered data structure 32 also includes a plurality of device names 42 which are added after the clustering process. Each device name includes an attribute of the device. For example, a device attribute may include at least one of the following: a device type; a device manufacturer; a device model, a device operating system, a device hardware element. Each device name 42 is associated with one of the clusters 38. The clusters 38 receive their device names 42 via a naming process discussed in more detail with reference to FIGS. 4-6. It should be noted that each of the clusters 38 may also include a non-descriptive cluster name or cluster ID. If a cluster 38 has an associated device name 42, the cluster name or cluster ID may be replaced by the associated device name 42 in the clustered data structure 32. Alternatively, even if the cluster 38 has an associated device name 42 the cluster 38 may still retain the cluster name or cluster ID which may be associated with the device name 42 of the cluster 38 via a data table, by way of example only. One or more of the clusters 38 may not have an associated device name (at least until they receive a device name via the naming process). Therefore, the clustered data structure 32 may include a sub-set of the clusters 38 having associated device names 42, where each cluster 38 in the sub-set has a different device name 42. Clusters 38 outside of that sub-set do not have an associated device name but will still have a non-descriptive cluster name or cluster ID. The above is now illustrated by way of the clusters 38 shown in FIG. 2. In FIG. 2, some of the clusters 38 have very detailed device names (based on available information), for example, the cluster 38(1) has the device name 42 equal to "AJAX freezer, model AJ105" and the cluster 38(2) has the device name 42 equal to "ACME TV, model XT430". Some of the clusters 38 have less name information, for example, the cluster 38(3) has the device name 42 equal to "ACME TV" without a model number at present and the cluster 38(4) has the device name 42 equal to "TV" where the manufacturer is unknown at present. Some of the clusters 38 do not have any associated device name information, for example, cluster 38(5), cluster 38(6) and cluster 38(7) which are marked on FIG. 2 as "unknown" (block 48). The naming of the clusters 38 may also have an assigned confidence level 46 that the device name 42 of the cluster 38 is correct. The confidence level 46 is described in more detail with reference to FIGS. 4-6.

Figure 3A:
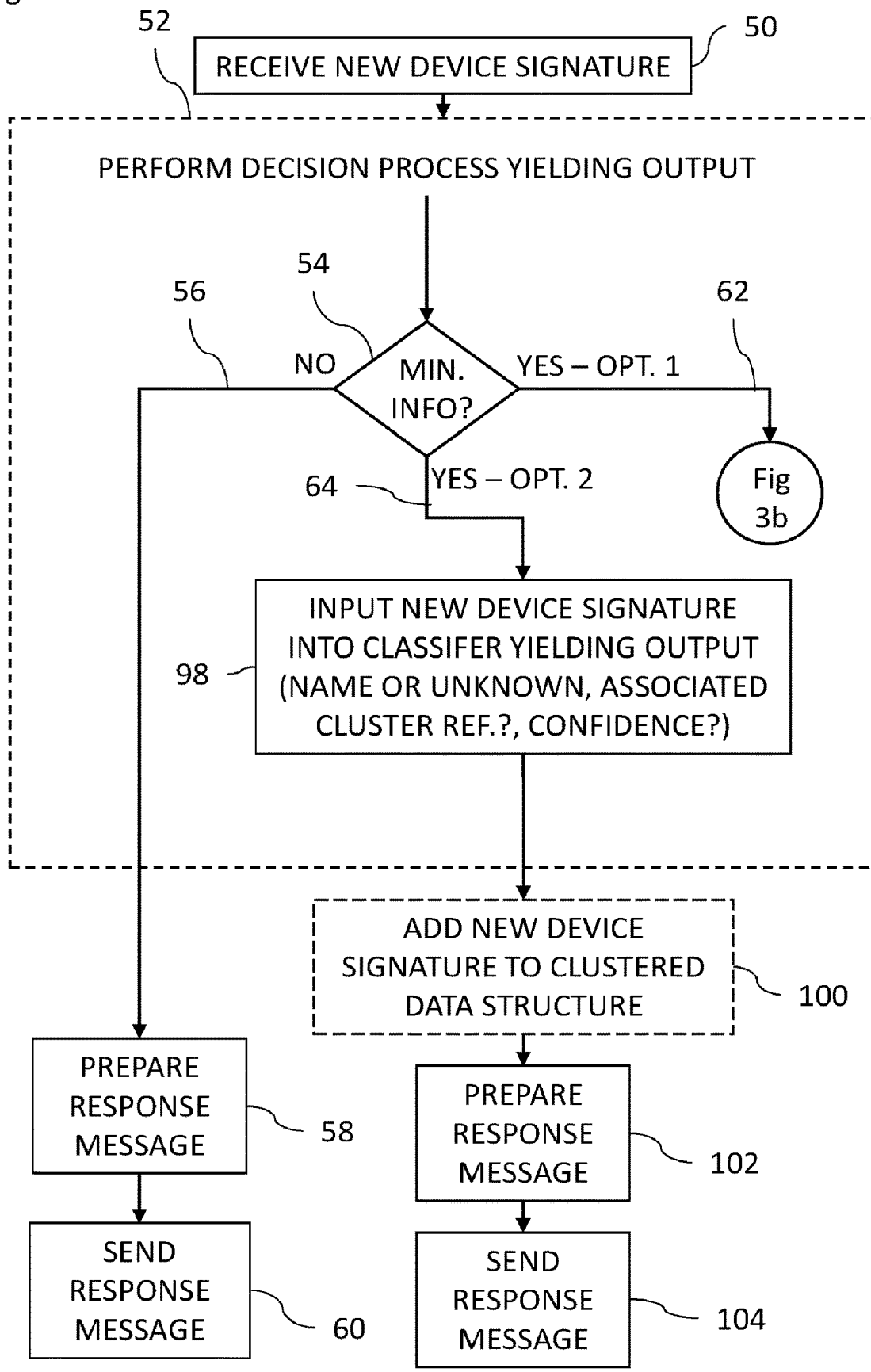
FIGS. 3a-3b include a flow chart of an exemplary method of processing a new device signature in the device discovery system of FIG. 1.
Figure 3B:
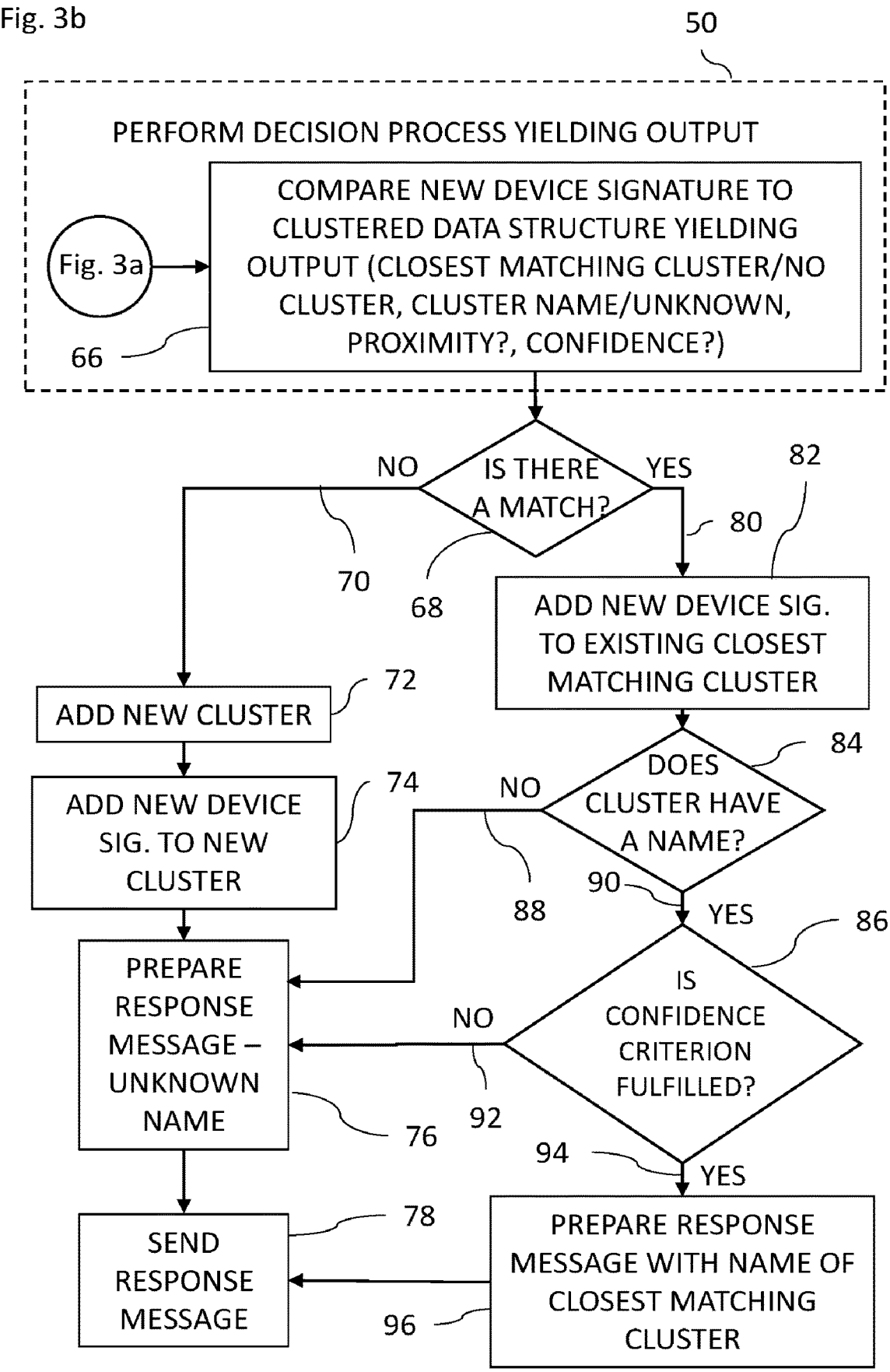

Reference is now made to FIGS. 3a-3b, which include a flow chart of an exemplary method of processing a new device signature. Reference is also made to FIG. 1. The processing of a new device signature is now described in more detail. The input/output sub-system 14 is operative to receive a new device signature from the discovery service provider 22 (block 50). In accordance with another embodiment the input/output sub-system 14 is operative to receive a new device signature from another remote device such as a device in the home 24, for example, but not limited to, the gateway data collection agent 26. The new device signature describes information about a new device installed in the home 24.

Next, the device identification processor 16 is operative to perform a decision process yielding an output (block 52). The process of block 52 is broken down into several sub-steps included in the dotted line box as shown in FIGS. 3a-3b as will now be described below.

The next step is a test for minimum information content of the new device signature. If the collected discovery data does not include enough information (predefined by the device discovery system 10), then the new device signature may be discarded as it is not useful for classifying the device information. A non-limiting example of a device signature not including enough information is a device signature which only includes a MAC address prefix or data accrued from banner grabbing. The device identification processor 16 is operative to determine if the new device signature includes a predefined minimum information content (decision block 54). If the new device signature does not include the minimum information content (branch 56), the device identification processor 16 is operative to prepare a response message 36 (block 58) and the input/output sub-system 14 is operative to send the response message 36 to the discovery service provider 22 (or another remote device) indicating that the new device signature lacks the minimum information content (block 60). If the new device signature does include the minimum information content, then the process continues down one or two optional branches, along branch 62 according to a first option and along branch 64 according to a second option, depending on the implementation of the device discovery system 10.

According to the first option (branch 62), the process continues as follows. The device identification processor 16 is operative to perform a decision process based on the clustered data structure 32 with the new device signature as input yielding an output (block 66). As part of the decision process, the device identification processor 16 is operative to compare the new device signature to the clustered data structure 32 to find a closest matching cluster of the clusters 38 (FIG. 2) for the new device signature. The new device signature may or may not be found to be close enough to one of the existing clusters 38. Even if a closest matching cluster 38 is found, the closing matching cluster 38 may or may not have an associated device name 42 (FIG. 2). If a closest matching cluster 38 is found and the closest matching cluster 38 has an associated device name 42, the output may include the device name 42 of the closest matching cluster 38 and a reference to the closest matching cluster (e.g., an ID of the closest matching cluster) in addition to the device name 42 associated with the closest matching cluster. If a closest matching cluster 38 is not be found or if the closest matching cluster 38 does not have an associated device name 42, then the output may include an indication that a name associated with the new device signature is unknown as well as a reference to the closest matching cluster (e.g., an ID of the closest matching cluster) if there is a closest matching cluster 38. An advantage of including the reference to the closest matching cluster in the output is described below.

The process continues at a decision point 68. If there is not a closest matching cluster from the clusters 38 (FIG. 2) (branch 70), for example, if the new device signature is measured by the device identification processor 16 as not being close enough to any of the clusters 38 based on a predetermined threshold (e.g., distance as will be described below), then the device identification processor 16 is operative to: add a new cluster to the clustered data structure 32 (block 72); and add the new device signature to the new cluster in the clustered data structure 32 (block 74). The threshold distance may be set by a network operator of the device discovery system 10 and possibly based on input from the discovery service providers 22. The device identification processor 16 is operative to prepare the response message 36 to include an indication that the name is unknown and optionally an identification of the new cluster (block 76). The identification of the new cluster may be useful when a device name is given to the new cluster at a later time. In such an instance, the cluster naming processor 18 may be operative to prepare a message for sending to the discovery service providers 22 listing the new cluster and the device name associated with the new cluster so that the discovery service providers 22 may update policies associated with devices linked to the new cluster. The response message 36 may also include the request identification (ID) included in the name request 30 as well as the generation index 44 (FIG. 2) of the clustered data structure 32. The inclusion of the generation index 44 in the response message 36 allows the discovery service providers 22 to decide when to request future updates for specific device signatures from the device discovery system 10 based on an updated version of the clustered data structure 32 as will be described in more detail with reference to FIGS. 7 and 8. The input/output sub-system 14 is operative to send the response message 36 to the discovery service provider 22 that sent the name request 30 (block 78).

Going back to decision point 68, if there is a closest matching cluster from the clusters 38 (FIG. 2) (branch 80), for example, if the new device signature is measured by the device identification processor 16 to be within the predetermined threshold of the closest matching cluster 38, then the device identification processor 16 is operative to add the new device signature to the closest matching cluster 38 in the clustered data structure 32 (block 82). The process continues at a decision point 84 where the device identification processor 16 examines the closest matching cluster 38 to determine if the closest matching cluster 38 has an associated device name 42. If the closest matching cluster 38 does not have an associated device name 42 (branch 88), the process continues with the step of block 76 but instead of including an identification of the new cluster, the identification of the closest matching cluster may be included. If the closest matching cluster 38 does have an associated device name 42 (branch 90), the process continues with a decision point 86 where a confidence criterion is checked. As discussed above, each device name 42 associated with a cluster 38 has a level of confidence 46 that the device name 42 of that cluster 38 is correct. The confidence level 46 is discussed in more detail with reference to FIGS. 4-6. At decision point 86 the device identification processor 16 is operative to check if the level of confidence 46 of the device name 42 of the closest matching cluster 38 fulfills a criterion of the discovery service provider 22 which sent the name request 30. This step is now described in more detail. The device identification processor 16 may be operative to check if the level of confidence 46 of the device name 42 of the closest matching cluster 38 is equal to, or above, a minimum level of confidence set by the discovery service provider 22 that sent the name request 30.

If the criterion is not fulfilled (branch 92), processing continues with the step of block 76 where the identification of the closest matching cluster may be included in the response message 36 but the device name 42 of the closest matching cluster 38 is not included. If the criterion is fulfilled (branch 94), the device identification processor 16 prepares the response message 36 which may include the request identification (ID) included in the name request 30, the generation index 44 (FIG. 2) of the clustered data structure 32, and data about the output of the decision process including: a reference to the closest matching cluster 38 (FIG. 2) (e.g., an ID of the closest matching cluster 38); the device name 42 of the closest matching cluster 38; and optionally the level of confidence 46 (FIG. 2) of the device name 42 of the closest matching cluster 38, e.g., if the confidence level 46 was requested by the discovery service provider 22 (block 96). The identification of the ID of the closest matching cluster 38 may be useful if a new device name 42, for example, a more detailed or a different device name, is given to the closest matching cluster 38. The processing of decision point 86 may be optional in that the branch 90 may continue straight on to the step of block 96 and bypass the decision point 86.

More details regarding the comparison of the new device signature to the clustered data structure 32 are now described. The details that follow may be applied to clustering and re-clustering of the device signatures 40 (FIG. 2) as well as to comparing a new device signature to the clustered data structure 32. The new device signature may be compared to all the device signatures in all of the clusters 38 (FIG. 2) or to a centroid of each of the clusters 38.

Each signature may have multiple coordinates (for example, but not limited to, a lists of open ports, operating system version, DHCP option list, MAC address, UPnP settings, and string of central processing unit (CPU) name). Some coordinates may be missing, some other coordinates available, some of which are strings, some are version numbers of installed components, some are network addresses, some are lists of numbers (such as a list of open ports) and some actual numbers (for example, but not limited to, time since last reset). Further, different signatures may contain different coordinates depending on what was available for collection. Therefore, specifying a distance metric between two signatures is an interesting challenge. For a given coordinate which exists in both signatures, there is a variety of metrics that could be used depending on the nature of that coordinate. The device discovery system 10 may be operative to apply different metrics to the different coordinates in the device signatures, such as edit distances or Levenshtein distances for strings by way of example only, Jaccard similarity for lists of numbers by way of example only, absolute differences for numbers by way of example only, some custom weighted metric for version numbers and network addresses by way of example only.

For coordinates which appear in one of the device signatures being compared but are missing in the other device signature of the comparison pair, the value of the metric for that coordinate needs to be defined. The value of the metric may be set, by way of example only, to some fixed positive number $C\_i$ (with i being the index of the coordinate) essentially pushing the two signatures in the comparison pair apart by $C\_i$ if the i-th coordinate is missing in either signature, or to zero having no effect on the distance between the two signatures, if the coordinate is not available in both.

All of the different coordinates may then be normalized and optionally weighted according to importance and summed together for example using a Euclidean distance or other suitable distance measure, as will now be described in more detail. In order to combine the different metrics for the individual coordinates M, the normalized distance metrics $M1(x,y), M2(x,y), M3(x,y) \ldots Mn(x,y)$ between a signature x and a signature y for coordinates 1 to n can be combined into a single metric such as the Euclidean distance/metric: $Mcomb(x,y)=sqrt(M1(x,y)^2+M2(x,y)^2+ \ldots +Mn(x,y)^2)$, in essence creating a norm out of given metrics. Alternatively an LI norm (sum of coordinates) or Lmax (maximum of coordinates) may be used. Also, each metric from among the given metrics may be assigned a specific weight signifying its importance for measuring the distance. A higher weight lends more importance to that specific coordinate. Then combining the different metrics for example with the Euclidean distance would look like $Mcomb\_weighted(x,y) =sqrt(w1*M1(x,y)^2+w2*M2(x,y)+ \ldots +wn*Mn(x,y)^2))$ with w1, w2, ... wn being the weights of the individual coordinates. Therefore, complex signatures can be evaluated against each other to produce a measure of similarity or distance between the signatures. The specific values for the weights, w1, ... wn, the choice of how to combine the different metrics, the choice of specific metrics for specific coordinates, and the values of the penalties $C\_1, \ldots C\_n$ for missing coordinates in either signature are all heuristic parameters that may be evaluated on an implementation by implementation basis and are applied to clustering as well as comparing a single new device signature to the device signatures or centroids of the clustered data structure 32.

Referring once again to FIG. 3*a*, according to the second option (branch 64), the process continues from the decision block 54 as follows. This second option is based on inputting the new device signature into the classifier 34 (FIG. 1). The classifier 34 is built from the clustered data structure 32 and is built to provide an output similar, or equal, to that would be produced by comparing the new device signature to the clustered data structure 32.

The device identification processor 16 (FIG. 1) is operative to perform a decision process with the new device signature as input to the classifier 34 (FIG. 1), yielding an output including a device name selected from one of the device names 42 (FIG. 2) or an indication that a name associated with the new device signature is unknown. The output may also include a reference of a closest matching cluster of the clusters 38 (FIG. 2) (e.g. a cluster ID) or a reference to a new cluster if the new device signature does not belong to any of the existing clusters 38. The output may also include, if available, the confidence level 46 (FIG. 2) associated with the closest matching cluster (block 98).

For the purposes of future re-clustering of the clustered data structure 32, the device identification processor 16 (FIG. 1) may be operative to add the new cluster to the clustered data structure 32 (FIG. 2) and to add the new device signature to the closest matching cluster 38 (FIG. 2) or the new cluster, as applicable, in the clustered data structure 32 (FIG. 2) (block 100).

The device identification processor 16 (FIG. 1) is operative to prepare the response message 36 (FIG. 1) (block 102). The response message 36 may include the request identification (ID) included in the name request 30, the generation index 44 (FIG. 2) of the clustered data structure 32 (FIG. 1), and data about the output including: a reference to the closest matching cluster 38 (FIG. 2) (e.g., an ID of the closest matching cluster 38) or the new cluster, as applicable; the device name 42 (FIG. 2) of the closest matching cluster 38 or an indication that the device name is unknown, as applicable; and the level of confidence 46 (FIG. 2) associated with the device name 42 of the closest matching cluster 38. Inclusion of the device name 42 of the closest matching cluster in the response message 36 may be dependent on whether the confidence level 46 of the device name 42 of the closest matching cluster is equal to, or above, the minimum level of confidence set by the discovery service provider 22 that sent the name request 30. The input/output sub-system 14 (FIG. 1) is operative to send the response message 36 (FIG. 1) to the discovery service provider 22 (FIG. 1) that sent the name request 30 (FIG. 1) (block 104).

Figure 4:
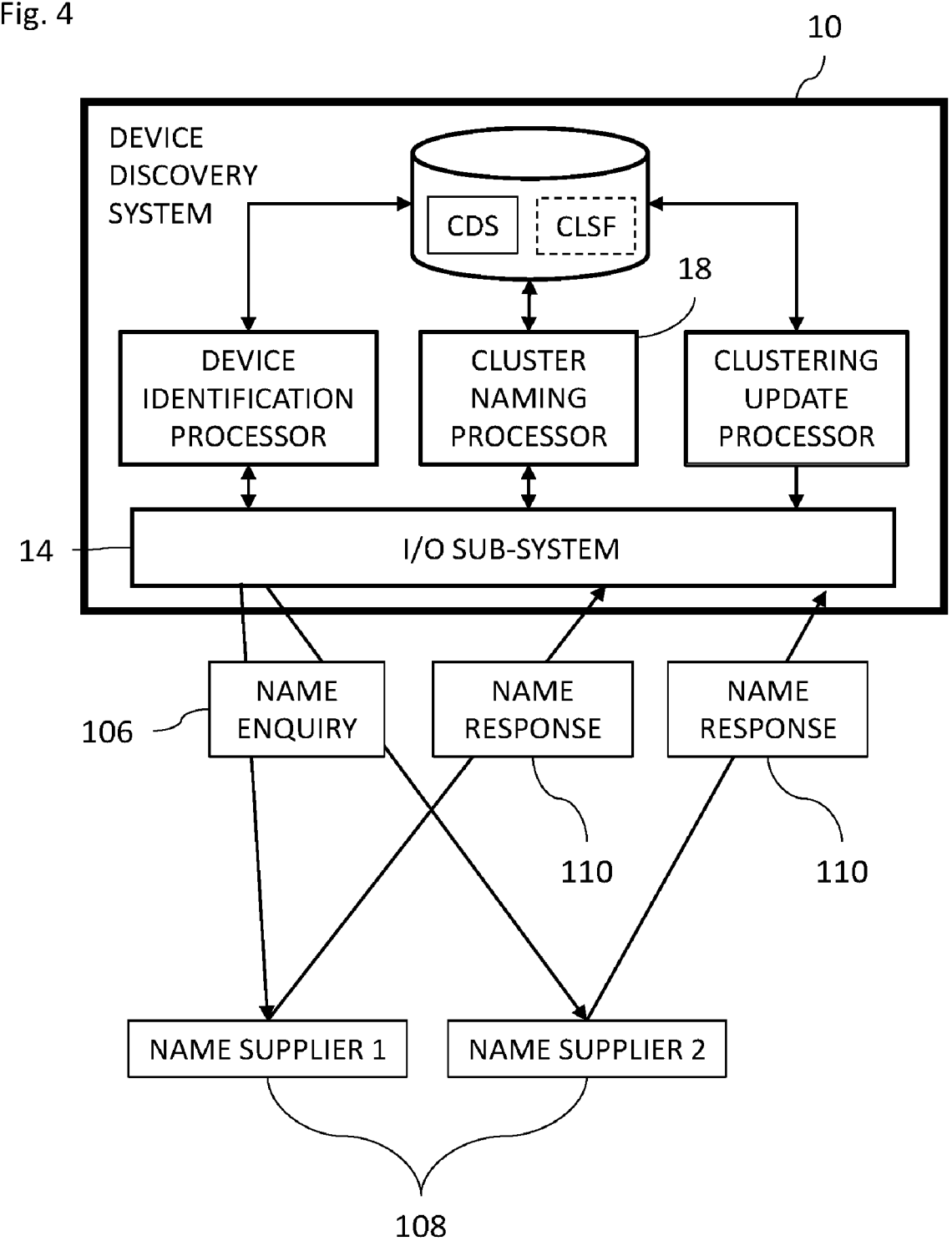
FIG. 4 is a block diagram view of the device discovery system of FIG. 1 performing cluster naming disambiguation.

Reference is now made to FIG. 4, which is a block diagram view of the device discovery system 10 of FIG. 1 performing cluster naming disambiguation. Disambiguating or labelling clusters 38 (FIG. 2) with 'unknown' device names or incomplete device names (e.g., only including device type and/or device manufacturer and/or a partial model number), or even device names with an associated low confidence level 46 (FIG. 2), is performed by the cluster naming processor 18. The cluster naming processor 18 is typically operative to send a name enquiry message 106 via the input/output sub-system 14 to one or more name suppliers 108 in order to obtain a device name for one of the clusters 38 (FIG. 2). Each name supplier 108 prepares a response and sends the response to the device discovery system 10 in a name response message 110. The disambiguation may need to be prioritized according to cluster needs. For example, clusters 38 with a higher number of device signatures 40 (FIG. 2) may take priority over clusters 38 with a lower number of device signatures 40, clusters 38 without an associated device name may take priority over clusters 38 with an associated incomplete device name, clusters 38 with a lower level of confidence in a device name may take priority over clusters 38 with a higher level of confidence in a device name, and so on. Other prioritization factors may include the threat that a device poses to the system and the vulnerability of that device to attacks and exploits by other home devices. Threats may be known from threat intelligence or posture assessment or a number of attacks on devices in this cluster as observed by the device discovery system 10 or the discovery service providers 22 (FIG. 1) or another threat intelligence service. Therefore, the cluster naming processor 18 is operative to select the cluster to obtain a device name for from the plurality of clusters 38 based on a prioritization of that cluster from among the plurality of clusters 38.

The name suppliers 108 may include manufacturers, research laboratories and users in the homes 24 (FIG. 1) by way of example only. The name suppliers 108 perform any necessary research and respond to the name enquiry message 106 by including a device name in the name response message 110. For example, a user in the home 24 of a device about which a new device signature was sent to the discovery service provider 22 (FIG. 1) of that home 24 may be contacted by the cluster naming processor 18 via that discovery service providers 22 to ask for information about the device associated with the new device signature. Name data may also be obtained from a search of the web for information either by manually searching the web or via an automated process which prioritizes the clusters 38 and automatically searches the web based on the data included in the clusters 38 or assigns tasks to manual search operators.

The cluster naming processor 18 may be operative to present the name response messages 110 to a human operator for inspection. The human operator may assign the confidence level 46 (FIG. 2) to the new device name or the confidence level 46 may be assigned automatically by the cluster naming processor 18 based on an assumed confidence level of each name supplier 108. Alternatively, the confidence level 46 may in some circumstances be assigned by the name supplier 108 providing the name. The confidence level 46 may also be a function of similarity among the name response messages 110 so that if two different name suppliers 108 are in agreement over a name, the confidence level 46 may be set at a higher level. If different names are supplied by different name suppliers 108, then the cluster naming processor 18 may select the name which was sourced from the name suppliers 108 with a highest credibility score. The credibility score may be assigned by the system administrator of the device discovery system 10. A human operator may also receive the name suppliers 108 in order to analyze the data of the cluster 38 (FIG. 2) in question and make any suitable decision, for example, but not limited to, associating a device name with the cluster 108, splitting the cluster 38 into two or more clusters, merging the cluster 38 with another cluster 38.

Figure 5:
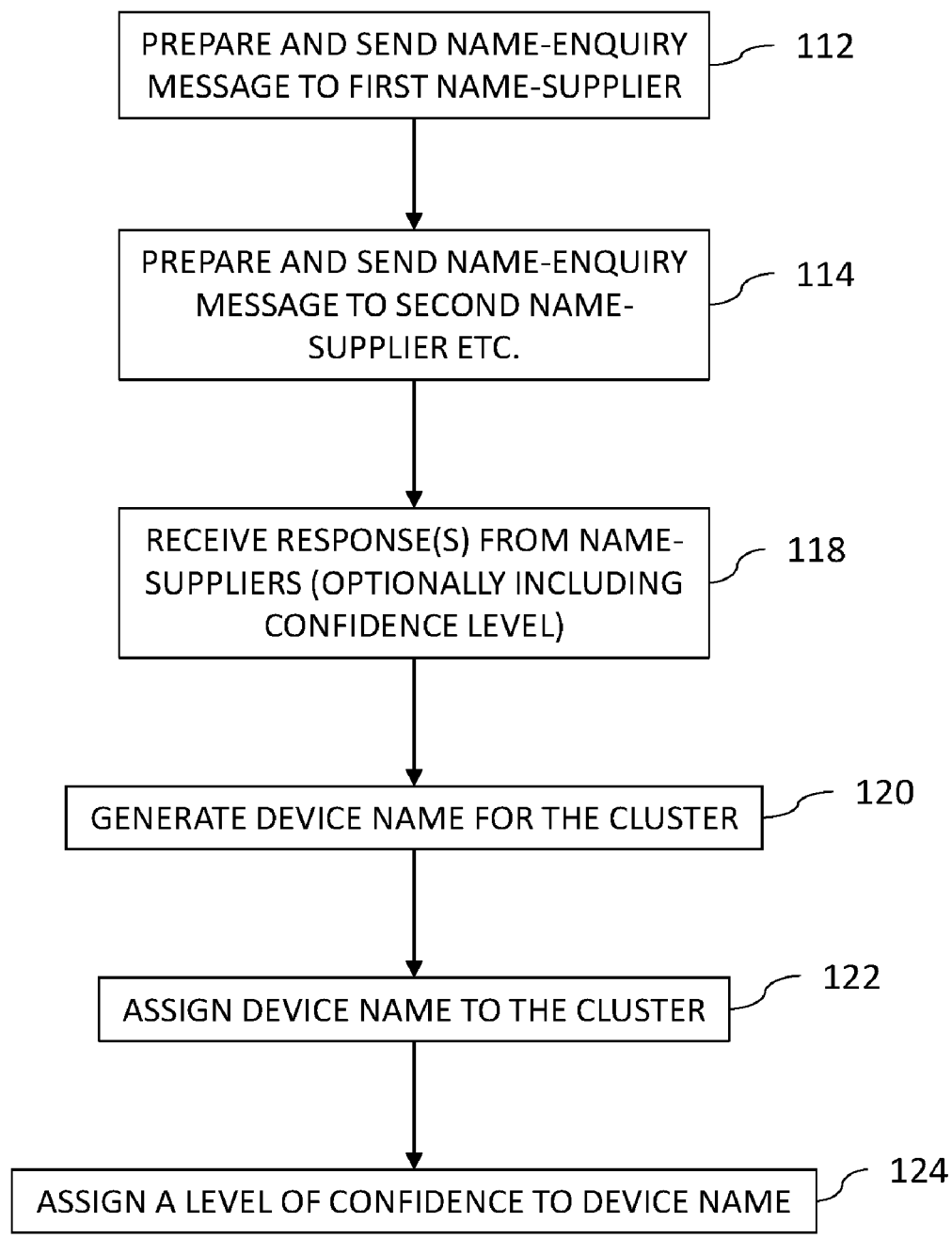
FIG. 5 is a flow chart of an exemplary method of performing cluster naming disambiguation in the device discovery system of FIG. 1.

Reference is now made to FIG. 5, which is a flow chart of an exemplary method of performing cluster naming disambiguation in the device discovery system 10 of FIG. 1. The cluster naming processor 18 (FIG. 4) is operative to prepare the name-enquiry message 106 for sending via the input/output sub-system 14 (FIG. 1) to a first one of the name suppliers 108 to find a device name for a selected cluster of the plurality of clusters 38 (FIG. 2) (block 112). The name-enquiry message may include, or reference (e.g., via a link), data from at least some device signatures 40 (FIG. 2) included in the selected cluster. The cluster naming processor 18 may be operative to prepare another name-enquiry message 106 (or use the same one) for sending via the input/output sub-system 14 to a second one of the name suppliers 108 to find a device name for the selected cluster (block 114). There may be a waiting period between sending the messages to the different name suppliers 108 to give the first name suppliers 108 time to respond. Alternatively, both name enquiry messages 106 may be sent to the name suppliers 108 without waiting for a response from either of the name suppliers 108. It will be appreciated that the name enquiry message(s) 106 may be sent to more than two name suppliers 108. The cluster naming processor 18 is operative to receive the name-response 110 from one or more of the name suppliers 108 via the input/output sub-system 14 (block 118). The input/output sub-system 14 may be operative to receive a level of confidence for the supplied name from each name supplier 108 queried (block 118). The cluster naming processor 18 is operative to generate a device name for the selected cluster 38 based on the name-response(s) 110 (block 120). The cluster naming processor 18 is operative to assign the generated device name to the selected cluster 38 (block 122). The cluster naming processor 18 may be operative to calculate the confidence level 46 (FIG. 2) based on a similarity of the name-response(s) from the different name suppliers 108. The cluster naming processor 18 is operative to assign the confidence level 46 that the generated device name of the selected cluster is correct (block 124).

Figure 6:
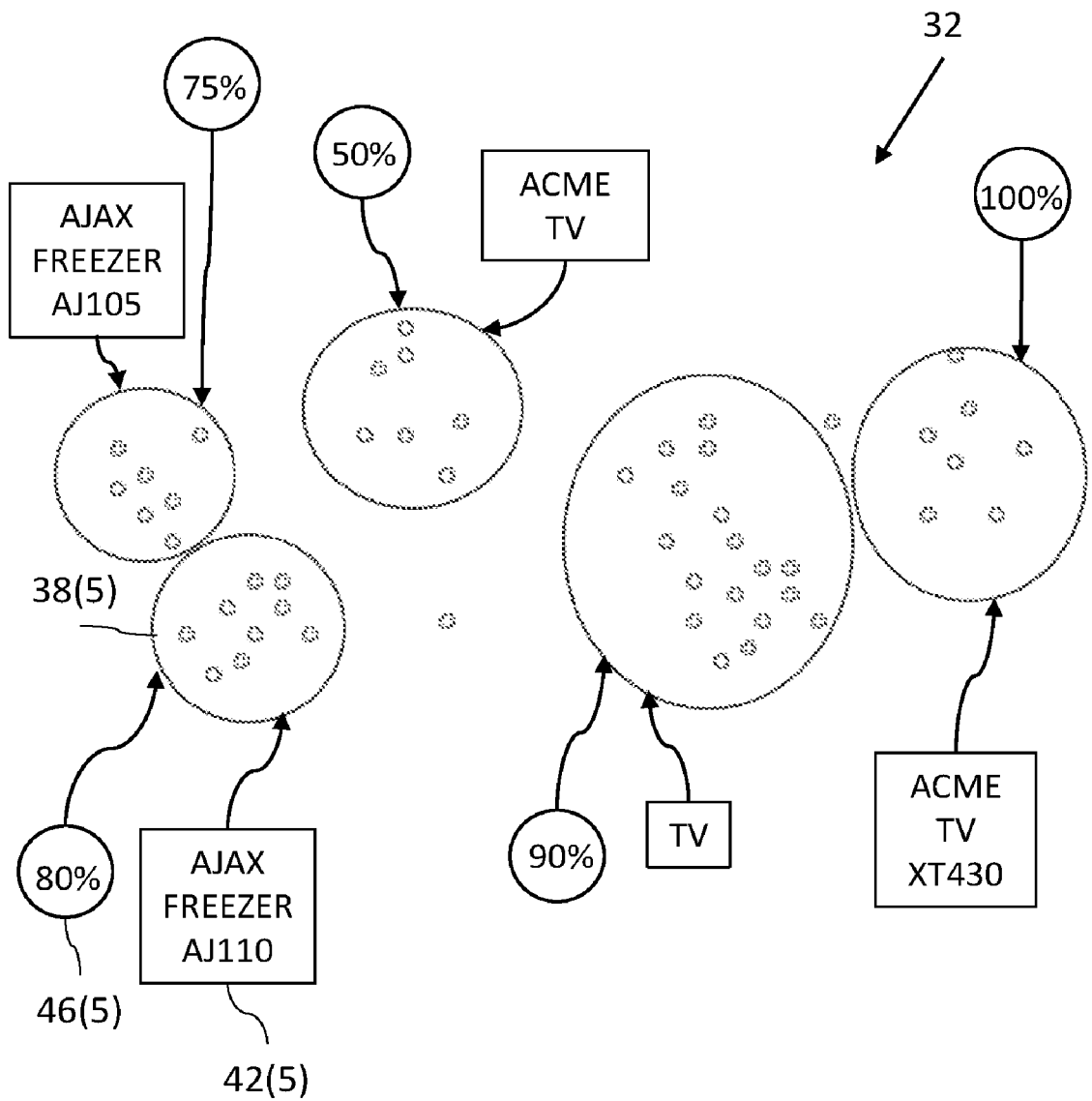
FIG. 6 is a partly pictorial, partly block diagram view of the clustered data structure of FIG. 2 after adding a name to a cluster.

Reference is now made to FIG. 6, which is a partly pictorial, partly block diagram view of the clustered data structure 32 of FIG. 2 after adding a device name 42(5) to the cluster 38(5). The cluster 38(5) is also shown as having been assigned a confidence level 46(5).

Figure 7:
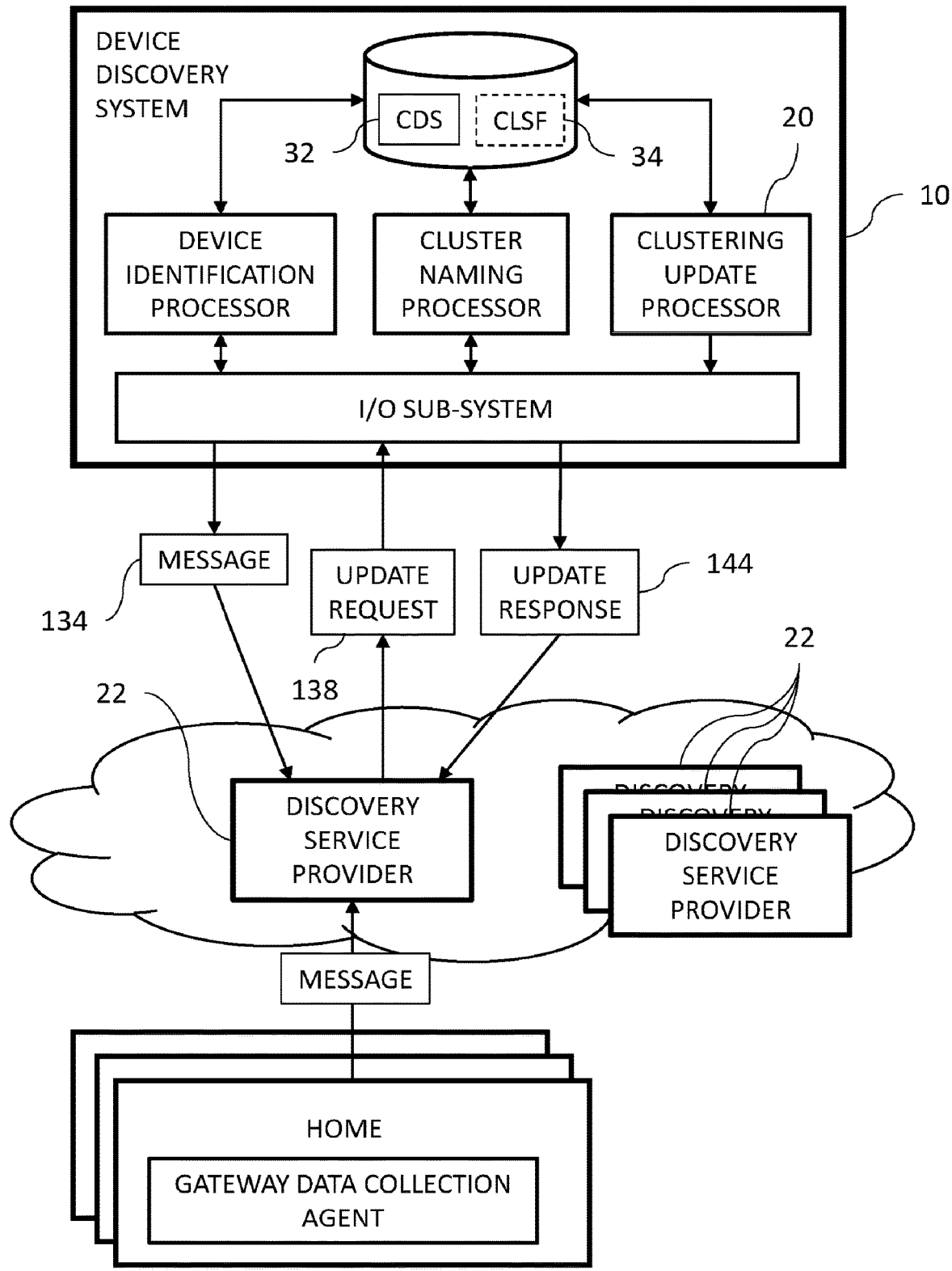
FIG. 7 is a block diagram view of the device discovery system of FIG. 1 processing a re-clustering process and related functions.

Reference is now made to FIG. 7, which is a block diagram view of the device discovery system 10 of FIG. 1 processing a re-clustering process and related functions. The clustered data structure 32 may be periodically re-clustered by the clustering update processor 20 according to a clustering algorithm. The re-clustering may be performed based on a predefined time elapse since the last re-clustering or based on a predefined number of new device signatures being added to the clustered data structure 32 since the last re-clustering or based on any other suitable criteria, for example, but not limited to, the processing power of the clustering update processor 20. Re-clustering may lead to splitting of clusters 38 (FIG. 2) into distinct clusters with new labels and/or joining distinct clusters 38 into a unified cluster and/or a more complex re-clustering. Another part of the system is to enable the discovery service providers 22 to provide batch updates of device signatures that were classified based on older versions of the clustered data structure 32. The batch update mechanism is enabled based on an asynchronous batch interface provided by the clustering update processor 20 to the discovery service providers 22.

Figure 8:
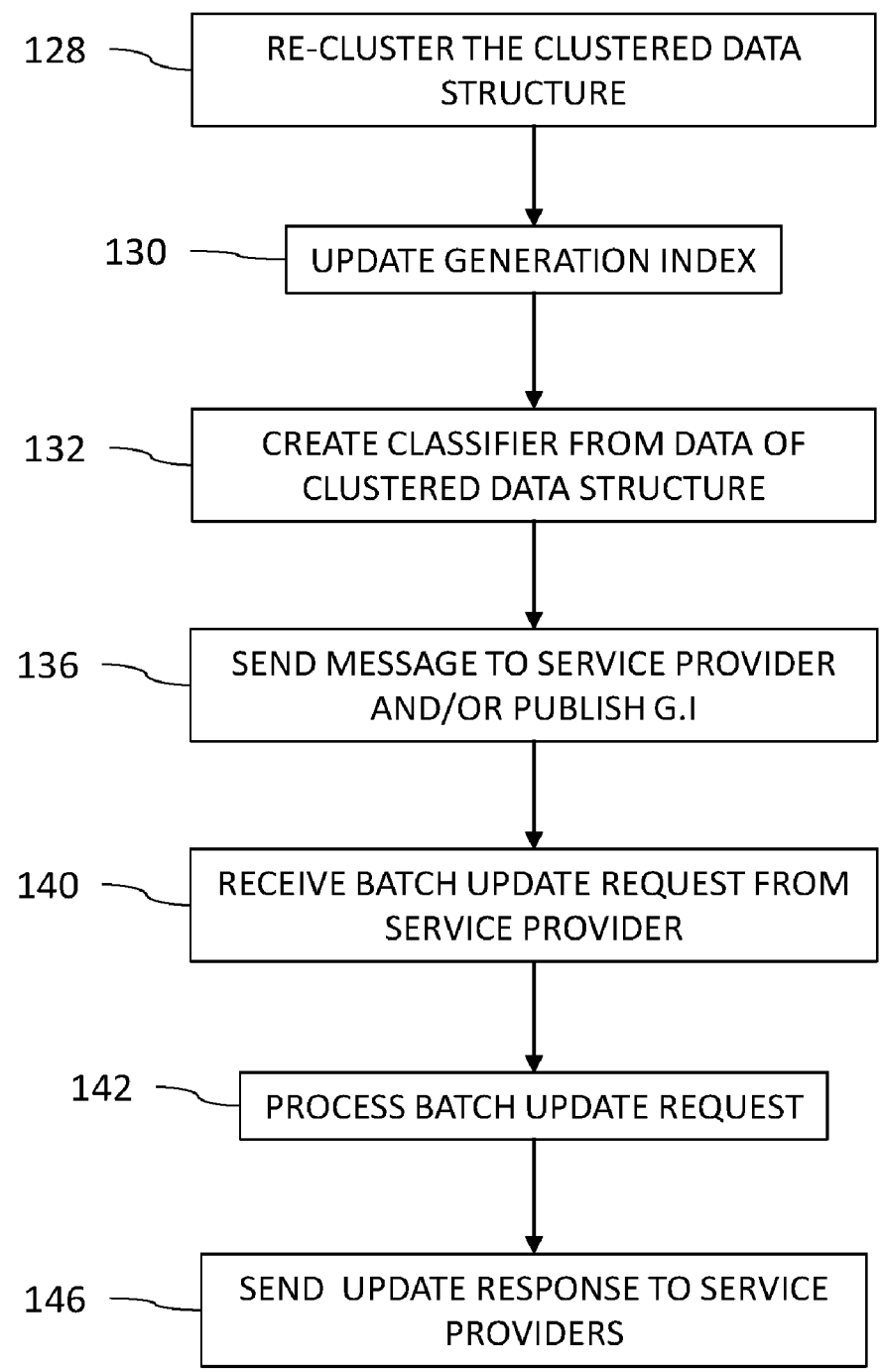
FIG. 8 is a flow chart of an exemplary method of re-clustering and related functions in the device discovery system of FIG. 1.

Reference is now made to FIG. 8, which is a flow chart of an exemplary method of re-clustering and related functions in the device discovery system 10 of FIG. 1. Reference is also made to FIG. 7. The clustering update processor 20 is operative to periodically: re-cluster the clustered data structure 32 in accordance with the clustering algorithm yielding a new generation of the clustered data structure 32 typically using all the device signatures 40 (FIG. 2) in the clustered data structure 32 as input and apply the device names 42 (FIG. 2) to the new generation of the clustered data structure 32 (block 128); and update the generation index 44 (FIG. 2) of the clustered data structure 32 in accordance with the new generation of the clustered data structure 32 (block 130). The device names 42 which were assigned to the clusters 38 in the previous generation of the clustered data structure 32 may be re-assigned to the clusters 38 in the new generation of the clustered data structure 32 accordance to a similarity of the clusters 38 in the previous generation and the new generation of the clustered data structure 32. For example, a cluster 38 having a cluster name A in the previous generation of the clustered data structure 32 may have a centroid B which is compared to the centroids of all the clusters 38 in the new generation of the clustered data structure 32 to find a cluster C having a centroid closest to the centroid B. The cluster name A is then assigned to the cluster C in the new generation of the clustered data structure 32. The confidence level 46 of the cluster name A for the cluster C may be based on the confidence level 46 of the cluster name A in the previous generation of the clustered data structure 32 optionally adjusted for based on the difference between the centroid of cluster C and the centroid B, by way of example only. The clustering update processor 20 is optionally operative to, in response to the clustered data structure 32 being re-clustered, create a classifier (to replace the classifier 34) based on the latest data of the clustered data structure 32 (block 132). The classifier 34 is trained based on the output of the clustering algorithm using the device signatures 40 of the clustered data structure 32 as input. The clustering update processor 20 is optionally operative, in response to the updating of the generation index 44 (FIG. 2), to create a message 134 informing the discovery service providers 22 of an updated value of the generation index 44. The input/output sub-system 14 is operative, in response to the updating of the generation index 44, to send the message 134 to the discovery service providers 22 and/or publish an updated value of the generation index (block 136). The input/output sub-system 14 is operative to receive a batch update request 138 from one of the service providers 22 (block 140) and pass the request to the clustering update processor 20. The batch update request 138 includes one or more device signatures for which a device name update is being requested. It will be appreciated that other update requests may be received from other discovery service providers 22 and processed as follows. The clustering update processor 20 is operative to process the batch update request 138 including individually inputting the received signatures into a decision process based on the clustered data structure 32 or the classifier 34 yielding a plurality of outputs in a similar manner that the device identification processor 16 processes each new device signature with the clustered data structure 32 or the classifier 34 as described above with reference to FIGS. 1-3 (block 142). Alternatively, if each device signature 40 (FIG. 2) is stored in the clustered data structure 32 with a unique identifier, the discovery service providers 22 may send the batch update request 138 including the unique identifiers of the device signatures 40 so that the clustering update processor 20 may find the unique identifiers (sent in the batch update request 138) in the clustered data structure 32 to determine the device names 42 associated with the clusters including the unique identifiers sent in the batch update request 138. The clustering update processor 20 is operative to prepare an update response 144 in a similar manner to the preparation of the response message 36 of FIG. 1 except that the update response 144 may include data related to more than one device. The input/output subsystem 14 is operative to send the update response 144 to the service providers 22 (block 146).

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A method, comprising:
obtaining, at a service executing on a device, a device signature of a particular device of a plurality of devices in a network environment, wherein the device signature is derived from data collected by a gateway data collection agent that probes the particular device via one or more discovery service providers in the network environment;
obtaining, at the service, a computed information-content score for the device signature, the computer information-content score indicating an amount of information in the device signature;
receiving, by the service and from a discovery service provider, a device-type label for a cluster of devices of the plurality of devices that is associated with a device type;
in response to the computed information-content score meeting a minimum information content threshold, invoking, by the service, a trained classifier stored in memory, where the device-type label and the device signature are used together as input to the trained classifier to classify whether the particular device is a match to a known device-type in a repository of known device types or else is an unknown type; and
obtaining, by the service, output of the trained classifier that indicates that the particular device is of an unknown type in response to the computed information-content score meeting the minimum information content threshold and the device signature failing to match any known device type.

2. The method as in claim 1, wherein the device signature comprises at least one of a: a list of open ports, operating system version, Dynamic Host Configuration Protocol (DHCP) option list, media access control (MAC) address, Universal Plug and Play (UPnP) settings, or a central processing unit (CPU) name.

3. The method as in claim 1, wherein the device type label for the cluster of devices comprises at least one of a device name, a type, a device manufacturer, or a device model.

4. The method as in claim 1, wherein the output of the trained classifier further indicates that a level of confidence is not satisfied for a match between the device-type label and the device signature.

5. The method as in claim 1, wherein the output of the trained classifier further indicates that the device signature matches to an existing unknown class of devices in the network environment.

6. The method as in claim 1, wherein the output of the trained classifier further indicates that the device signature is of a new unknown class of devices in the network environment.

7. The method as in claim 6, further comprising:
adding, by the service, the new unknown class of devices as a new label to the trained classifier.

8. An apparatus, comprising:
one or more network interfaces to communicate with a network;
a processor coupled to the one or more network interfaces and configured to execute one or more processes; and
a memory configured to store a process executable by the processor, the process when executed configured to:
obtain a device signature of a particular device of a plurality of devices in a network environment, wherein the device signature is derived from data collected by a gateway data collection agent that probes the particular device via one or more by discovery service providers in the network environment;
obtain a computed information-content score for the device signature, the computed information-content score indicating an amount of information in the device signature;

receive, from a discovery service provider, a device-type label for a cluster of devices of the plurality of devices that is associated with a device type;

in response to the computed information-content score meeting a minimum information content threshold, invoke a trained classifier stored in the memory, wherein the device-type label and the device signature are used together as input to the trained classifier to classify whether the particular device is a match to a known device-type in a repository of known device types or else is an unknown type; and obtain output of the trained classifier that indicates that the particular device is of an unknown type in response to the computed information-content score meeting the minimum information content threshold and the device signature failing to match any known der ice type.

9. The apparatus as in claim 8, wherein the device signature comprises at least one of a: a list of open ports, operating system version, Dynamic Host Configuration Protocol (DHCP) option list, media access control (MAC) address, Universal Plug and Play (UPnP) settings, or a central processing unit (CPU) name.

10. The apparatus as in claim 8, wherein the device-type label for the cluster of devices comprises at least one of a device name, a type, a device manufacturer, or a device model.

11. The apparatus as in claim 8, wherein the output of the trained classifier further indicates that a level of confidence is not satisfied for a match between the device-type label and the device signature.

12. The apparatus as in claim 8, wherein the output of the trained classifier further indicates that the device signature matches to an existing unknown class of devices in the network environment.

13. The apparatus as in claim 8, wherein the output of the trained classifier further indicates that the device signature is of a new unknown class of devices in the network environment.

14. The apparatus as in claim 13, wherein the process when executed is further configured to:

add the new unknown class of devices as a new label to the trained classifier.

15. A tangible, non-transitory, computer-readable medium storing program instructions that cause a service to execute a process comprising:

obtaining, at a service executing on a device, a device signature of a particular device of a plurality of devices in a network environment, wherein the device signature is derived from data collected by a gateway data collection agent that probes the particular device via one or more discovery service providers in the network environment; obtaining, at the service, a computed information-content score for the device signature, the computed information-content score indicating an amount of information in the device signature;

receiving, by the service and from a discovery service provider, a device-type label for a cluster of devices of the plurality of devices that is associated with a device type;

in response to the computed information-content score meeting a minimum information content threshold, invoking, by the service, a trained-classifier stored in memory, wherein the device-type label and the device signature are used together as input to the trained classifier to classify whether the particular device is a match to a known device-type in a repository of known device types or else is an unknown type; and obtaining, by the service, output of the trained classifier that indicates that the particular device is of an unknown type in response to the computed information-content score meeting the minimum information content threshold and the device signature failing to match any known device type.

16. The tangible, non-transitory, computer-readable medium storing program instructions as in claim 15, wherein the output of the trained classifier further indicates that the device signature matches to an existing unknown class of devices in the network environment.

17. The tangible, non-transitory, computer-readable medium storing program instructions as in claim 15, wherein the output of the trained classifier further indicates that the device signature is of a new unknown class of devices in the network environment.

18. The tangible, non-transitory, computer-readable medium storing program instructions as in claim 17, the process further comprising:

adding, by the service, the new unknown class of devices as a new label to the trained classifier.

* * * * *